(12) United States Patent
Menke

(10) Patent No.: US 11,371,471 B2
(45) Date of Patent: Jun. 28, 2022

(54) TANK SYSTEM FOR A MOTOR VEHICLE

(71) Applicant: Dr. Ing. h.c.F. Porsche Aktiengesellschaft, Stuttgart (DE)

(72) Inventor: Andreas Menke, Tiefenbronn Lehningen (DE)

(73) Assignee: Dr. Ing. h.c.F. Porsche Aktiengesellschaft

( * ) Notice: Subject to any disclaimer, the term of this patent is extended or adjusted under 35 U.S.C. 154(b) by 0 days.

(21) Appl. No.: 15/460,909

(22) Filed: Mar. 16, 2017

(65) Prior Publication Data

US 2017/0184059 A1 Jun. 29, 2017

Related U.S. Application Data

(63) Continuation-in-part of application No. 13/419,985, filed on Mar. 14, 2012, now abandoned.

(30) Foreign Application Priority Data

Mar. 16, 2011 (DE) ........................ 10 2011 001 310

(51) Int. Cl.
 *F02M 33/02* (2006.01)
 *F02M 25/08* (2006.01)
 *B60K 15/035* (2006.01)
 *B01D 53/04* (2006.01)

(52) U.S. Cl.
 CPC ..... *F02M 25/0854* (2013.01); *B01D 53/0407* (2013.01); *B60K 15/03504* (2013.01); *F02M 25/0872* (2013.01); *B01D 2253/102* (2013.01); *B01D 2257/702* (2013.01); *B01D 2259/4516* (2013.01); *B01D 2259/4566* (2013.01); *B60K 2015/03514* (2013.01); *B60K 2015/03523* (2013.01)

(58) Field of Classification Search
 CPC ............. F02M 25/0872; F02M 25/089; B60K 2015/03504; B60K 2015/03514; B60K 2015/03571; B60K 2015/03576
 USPC ........................ 123/516, 518–520; 180/65.21
 See application file for complete search history.

(56) References Cited

U.S. PATENT DOCUMENTS 3,352,294 A * 11/1967 Skarstrom ........ B60K 15/03504
 123/519
3,515,107 A * 6/1970 Joyce ................... F02M 25/089
 123/520

(Continued)

FOREIGN PATENT DOCUMENTS

CN 201934213 U * 8/2011
DE 10035125 A1 * 1/2002 ....... B60K 15/03504

(Continued)

*Primary Examiner* — John M Zaleskas
(74) *Attorney, Agent, or Firm* — Gerald E. Hespos; Michael J. Porco; Matthew T. Hespos

(57) ABSTRACT

A tank system (1) for a motor vehicle having an internal combustion engine to which fuel is supplied from a tank (2), wherein the tank (2) is assigned, in a ventilation path to the atmosphere (7), a flushable filter device (6, 6) for being loaded with hydrocarbon vapors of the fuel. The filter device (6, 6) has multiple mutually separate activated carbon filters (6). All of the activated carbon filters (6) are connected permanently in parallel. In this way, the ventilation resistance from the tank in the direction of the atmosphere can be kept low.

6 Claims, 1 Drawing Sheet

(56) References Cited

U.S. PATENT DOCUMENTS

| | | | | |
|---|---|---|---|---|
| 3,575,152 A * | 4/1971 | Wentworth | F02M 25/089 | 123/520 |
| 3,972,201 A * | 8/1976 | Datis | B01D 53/04 | 62/46.1 |
| 4,279,233 A * | 7/1981 | Tobita | F02M 25/0854 | 123/519 |
| 4,790,283 A * | 12/1988 | Uranishi | B60K 15/03519 | 123/516 |
| 4,872,439 A * | 10/1989 | Sonoda | B60K 15/03504 | 123/516 |
| 5,039,651 A * | 8/1991 | Kosaka | B01D 53/72 | 502/423 |
| 5,056,494 A * | 10/1991 | Kayanuma | F02M 25/0872 | 123/516 |
| 5,111,795 A * | 5/1992 | Thompson | F02M 25/0872 | 123/519 |
| 5,165,379 A * | 11/1992 | Thompson | B60K 15/03504 | 123/516 |
| 5,377,644 A * | 1/1995 | Krohm | F02D 41/0032 | 123/520 |
| 5,456,237 A * | 10/1995 | Yamazaki | F02M 25/0854 | 123/519 |
| 5,456,238 A * | 10/1995 | Horiuchi | B60K 15/03504 | 123/520 |
| 5,564,398 A * | 10/1996 | Maeda | F02M 25/0854 | 123/519 |
| 5,632,252 A * | 5/1997 | Hyodo | F02D 41/0042 | 123/520 |
| 5,915,364 A * | 6/1999 | Katou | F02M 25/0854 | 123/519 |
| 6,526,950 B2 * | 3/2003 | Ito | F02M 25/089 | 123/518 |
| 7,410,585 B2 * | 8/2008 | Rohrbach | B01D 15/00 | 123/434 |
| 8,336,526 B1 * | 12/2012 | Martin | F02M 25/0809 | 123/518 |
| 2008/0283127 A1 * | 11/2008 | Wang | B60K 15/03519 | 137/313 |
| 2009/0007890 A1 * | 1/2009 | Devries | F02M 25/089 | 123/520 |
| 2009/0288645 A1 * | 11/2009 | Childress | F02M 25/089 | 123/520 |
| 2011/0011264 A1 * | 1/2011 | Makino | B01D 53/0415 | 96/6 |
| 2012/0152211 A1 * | 6/2012 | Pursifull | F02B 43/10 | 123/520 |
| 2012/0234300 A1 * | 9/2012 | Menke | B60K 15/03504 | 123/519 |
| 2014/0007849 A1 * | 1/2014 | Nagasaku | F02M 25/089 | 123/519 |

FOREIGN PATENT DOCUMENTS

| | | | | |
|---|---|---|---|---|
| DE | 102008009571 A1 * | 8/2009 | | F02M 25/0854 |
| DE | 102008016079 A1 * | 10/2009 | | B60K 6/22 |
| DE | 102008045010 A1 * | 3/2010 | | F02M 25/089 |
| DE | 102009036262 A1 * | 2/2011 | | F02M 25/0836 |
| DE | 102009036265 A1 * | 2/2011 | | B60K 15/03504 |
| DE | 102010006042 A1 * | 8/2011 | | B01D 53/0438 |
| DE | 102010019373 A1 * | 11/2011 | | B60K 15/03504 |
| JP | 53088409 A * | 8/1978 | | |
| JP | 05223020 A * | 8/1993 | | |
| JP | 2010270652 A * | 12/2010 | | |

\* cited by examiner

TANK SYSTEM FOR A MOTOR VEHICLE

CROSS REFERENCE TO RELATED APPLICATION

This application is a continuation-in-part of application Ser. No. 13/419,985, filed Mar. 14, 2012, which in turn claims priority under 35 USC 119 to German Patent Application No 10 2011 001 310.5 filed on Mar. 16, 2011, the entire disclosures of which are incorporated herein by reference.

BACKGROUND OF THE INVENTION

1. Field of the Invention

The invention relates to a tank system for a motor vehicle having an internal combustion engine and a tank that supplies fuel to the internal combustion engine. A ventilation path extends from the tank to the atmosphere and a flushable filter device is in the ventilation path. The filter device can be loaded with hydrocarbon vapors of the fuel and has multiple mutually separate activated carbon filters.

2. Description of the Related Art

Hydrocarbon vapors accumulate within the fuel tank of a motor vehicle during fueling and also while driving. It is desirable to prevent the hydrocarbon vapors from passing into the atmosphere. The tank therefore has a flushable filter device in a ventilation path to the atmosphere. The filter device can be loaded with hydrocarbon vapors of the fuel. The filter device is flushed from time to time and the hydrocarbon vapors bound therein are conducted to the internal combustion engine for burning, thereby emptying the filter device.

A tank system designed according to the features mentioned in the introduction is known from DE 197 56 606 A1 discloses a tank system with two activated carbon filters connected in series in a first operating state. However, the tank system also has a bypass so that in a second operating state a partial flow can be conducted directly to the downstream activated carbon filter.

U.S. Pat. No. 3,352,294 describes an arrangement of an internal combustion engine with a carburetor, and of a tank system with two activated carbon filters. One of the activated carbon filters is arranged in the ventilation path of the tank to the atmosphere. The other activated carbon filter is assigned to a float chamber of the carburetor.

US 2007/0199547 A1 describes an activated carbon filter of modular construction.

It is an object of the present invention to further develop a tank system so that the ventilation resistance from the tank in the direction of the atmosphere is low.

SUMMARY OF THE INVENTION

The invention relates to a tank system where plural activated carbon filters are connected permanently in parallel. In particular, two or four activated carbon filters are provided. If four activated carbon filters are used, in each case two activated carbon filters form a filter pair.

The mutually separate activated carbon filters connected in parallel achieves lower flow resistance for the filter device. This is particularly advantageous in the case of pressurized tank systems and in which the fueling ventilation path is conducted via the filter device. More particularly, there is the problem that the resistance of a pressure-holding valve of the pressurized tank system adds to the resistance of the filter device during fueling. If a limit resistance is exceeded, fuelling is then no longer possible at all, or possible only to a restricted extent.

The tank system may be a normal or pressurized tank system. In the case of the pressurized tank system, a pressure prevails that is elevated in relation to ambient pressure. The elevated pressure is ensured by the pressure-holding valve.

If two filter pairs are used, one filter pair is assigned to a ventilation path to the atmosphere during the fueling of the vehicle, and the other filter pair is assigned to a ventilation path to the atmosphere during operation of the vehicle.

It is preferable for two identical activated carbon filters, or two identical activated carbon filters in the respective filter pair, to be used. The activated carbon filters are loaded and flushed in accordance with the volume flow distribution. The total absorption capacity of the two individual activated carbon filters should be dimensioned to be slightly larger than the absorption capacity of a single large activated carbon filter due to component deviations of the activated carbon filters.

The vehicle preferably is a hybrid vehicle, a plug-in hybrid or a motor vehicle with a start-stop device. In such vehicles, it is important to keep the vapor formation in the tank, and therefore to keep loading of the activated carbon filter low. The design of the tank system of the invention is basically independent of the type of motor vehicle.

Further features of the invention will emerge from the claims, from the appended drawing and from the description of the preferred exemplary embodiments depicted in the drawing, without the invention being restricted to these.

DETAILED DESCRIPTION OF THE PREFERRED EMBODIMENTS

Figure 1:
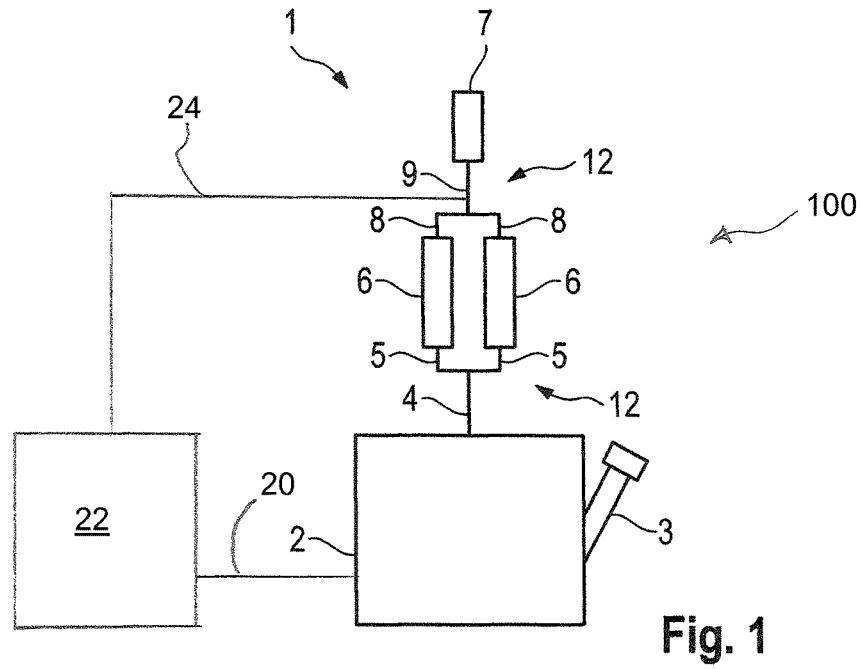
FIG. 1 is a first exemplary embodiment of the parallel arrangement of activated carbon filters in the tank system for the motor vehicle.
Figure 2:
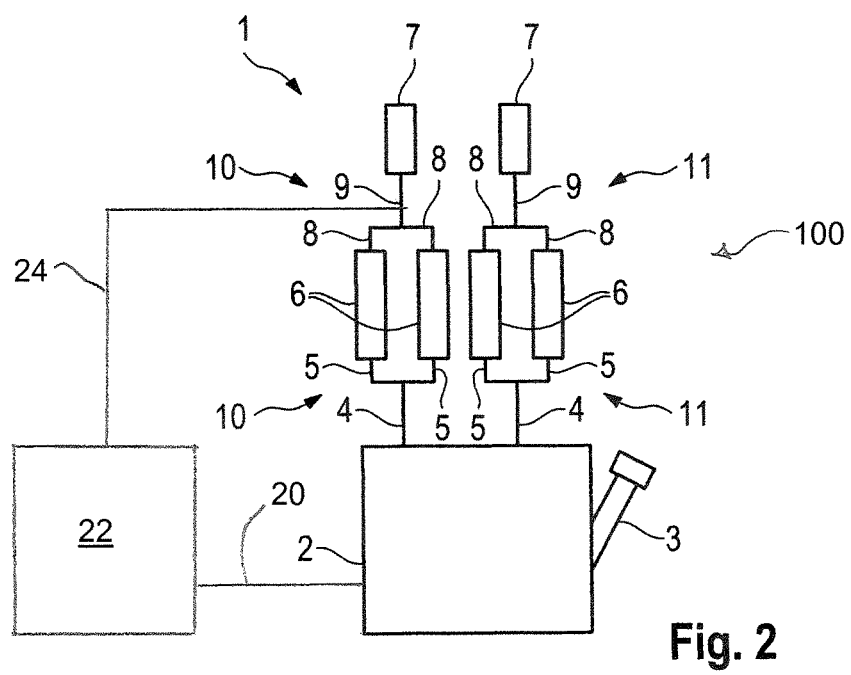
FIG. 2 shows a second exemplary embodiment of the parallel arrangement of activated carbon filters in the tank system for the motor vehicle.

The tank systems 1 shown in FIGS. 1 and 2 are used in a hybrid vehicle, a plug-in hybrid vehicle or a motor vehicle with a start-stop device. The vehicle is identified generallyy by the numeral 100 in FIGS. 1 and 2.

The tank system 1 of FIG. 1 has a tank 2 for fuel. The tank 2 has a filler neck 3 that can be closed off. Fuel lines 20 extend from the tank 2 to an internal combustion engine 22 of the motor vehicle are not shown. Hydrocarbon vapors of the fuel accumulate in the tank 2 during fueling of the tank and during operation of the vehicle and the internal combustion engine. These hydrocarbon vapors are conducted via a ventilation path 12 to the atmosphere. The ventilation path 12 is formed by a ventilation line 4 that is connected to the tank 2 and which, proceeding from the tank 2, splits into two inlet branch line portions 5 of equal lengths and identical cross sections. A valve (not shown) may be in the ventilation line 4, but no valves are in the inlet branch line portions 5. Each inlet branch line portion 5 is connected to an inlet of an activated carbon filter 6. The two activated carbon filters 6 are separate from one another and are connected permanently in parallel. The filter device formed by the two activated carbon filters 6 can be flushed from time to time so that the hydrocarbon vapors bound therein are conducted to the internal combustion engine 22 via feed lines 24 for burning so that the filter device is emptied. The reference numeral 7 denotes the atmosphere to which the ventilation path 12 runs from the tank 2 and the activated carbon filters 6. The two activated carbon filters 6 are connected for example via outlet branch line portions 8 of equal lengths and identical cross sections and an adjoining, common line 9 to the atmosphere 7. A valve (not shown) may be in the common line 9, but no valves are in outlet branch line portions 8. With this configuration, a flow distance from the tank 2 to the common line 9 is the same through each of the activated carbon filters 6.

The tank system 1 is designed so that the tank 2 is pressurized to reduce the vapor generation in the tank during operation and during fuelling. In the ideal case, the tank 2 is completely closed off. The tank 2 therefore is pressurized by a pressure-holding valve and protected against negative pressure by a negative pressure protection valve. The pressurization with the hold pressure is desirable to minimize the vapor emissions. Thus, the resistance in the ventilation path 12 of the activated carbon filter must be lowered. For this reason, the two activated carbon filters 6 connected permanently in parallel are arranged in the ventilation path 12. These are preferably two identical activated carbon filters 6 and are loaded, and likewise flushed, in accordance with the volume flow distribution. Small deviations of the components with respect to one another are inevitable. Thus, it is not possible to obtain exactly identical loadings and regeneration. Thus, the total absorption capacity of the two activated carbon filters 6 is slightly larger than the absorption capacity of a single, large activated carbon filter.

The embodiment according of FIG. 2 differs from FIG. 1 merely in that two ventilation paths 10, 11 run from the tank 2 to the atmosphere. Each ventilation path is assigned a pair of activated carbon filters 6. Thus four activated carbon filters 6 are provided, which may self-evidently also differ. One ventilation path 10 is provided for the fueling function and the other ventilation path 11 is provided for the ventilation function during operation of the motor vehicle and of the internal combustion engine. This permits selective or simultaneous loading of the activated carbon filters 6 during the "fueling" function and "during operation".

The components that correspond in both embodiments are denoted by the same reference numerals in FIGS. 1 and 2.

The resistance during the ventilation of the tank is made up of different components. For example, a resistance during the tank ventilation is generated for example by lines, valves and the like, and also by the resistance of the activated carbon filters 6. Further resistances during the tank ventilation are generated due to the line conditions and the like between the activated carbon filters 6 and the atmosphere 7.

What is claimed is:

1. A tank system for a motor vehicle having an internal combustion engine and a tank that supplies fuel to the internal combustion engine, the tank system comprising a ventilation path comprising:
    a common inlet line extending from the tank, the common inlet line having an upstream end at the tank and a downstream end opposite the upstream end of the common inlet line,
    first and second inlet branch lines of equal lengths and identical cross sections extending from the downstream end of the common inlet line and configured for dividing a gas flow from the common inlet line into partial gas flows,
    first and second mutually separate activated carbon filters that are substantially identical to one another, the first and second activated carbon filters being provided respectively with first and second inlets communicating respectively with ends of the first and second inlet branch lines opposite the downstream end of the common inlet line so that flow lengths from the tank to the first and second activated carbon filters are equal, the first and second activated carbon filters further being provided respectively with first and second outlets separate from the respective first and second inlets, and the ventilation path further having
    first and second outlet branch lines of equal lengths and identical cross sections extending respectively from the first and second outlets of the first and second activated carbon filters, and
    a common outlet line having an upstream end communicating with the first and second outlet branch lines and a downstream end opposite the upstream end of the common outlet line and extending to the atmosphere, no valves being disposed in the first and second outlet branch lines so that the first and second activated carbon filters of the ventilation path are connected permanently in parallel for receiving the first and second partial gas flows, the tank system further comprising
    a feed line extending from the common outlet line to the internal combustion engine for selectively flushing hydrocarbon vapors from the first and second activated carbon filters to the internal combustion engine, whereby a flow distance from the tank to the feed line is the same through each of the first and second activated carbon filters.

2. The tank system of claim 1, wherein the first and second mutually separate activated carbon filters of the ventilation path are the only activated carbon filters of the ventilation path.

3. The tank system of claim 2, wherein the ventilation path is a first ventilation path, and wherein the tank system further comprises a second ventilation path having a second common inlet line communicating with the tank, the second common inlet line having an upstream end at the tank and a downstream end opposite the upstream end of the second common inlet line, third and fourth inlet branch lines of equal lengths and identical cross sections extending from the downstream end of the second common inlet line and configured for dividing a gas flow from the second common inlet line into third and fourth partial gas flows, third and fourth substantially identical activated carbon filters, the third and fourth activated carbon filters being provided respectively with third and fourth inlets communicating respectively with ends of the third and fourth inlet branch lines opposite the downstream end of the second common inlet line so that flow lengths from the tank to the third and fourth activated carbon filters are equal, the third and fourth activated carbon filters further being provided respectively with third and fourth outlets separate from the respective third and fourth inlets, and the second ventilation path further having
    third and fourth outlet branch lines of equal lengths and identical cross sections extending respectively from the third and fourth outlets of the respective third and fourth activated carbon filters of the second ventilation path,
    a second common outlet line having an upstream end communicating respectively with the third and fourth outlet branch lines and a downstream end opposite the upstream end of the second common outlet line and extending to the atmosphere, no valves being disposed in the third and fourth outlet branch lines so that the third and fourth activated carbon filters are connected permanently in parallel for receiving the third and fourth partial gas flows.

4. The tank system of claim 3, wherein the second ventilation path communicates with the atmosphere during fueling of the vehicle, and the first ventilation path communicates with the atmosphere during operation of the vehicle.

5. The tank system of claim 1, wherein the tank is pressurized.

6. The tank system of claim 1, wherein said tank system is a tank system of a hybrid vehicle, of a plug-in hybrid vehicle or of a motor vehicle with a start-stop device.

* * * * *